(12) United States Patent
Althaus et al.

(10) Patent No.: US 6,783,284 B2
(45) Date of Patent: Aug. 31, 2004

(54) OPTICAL MODULE FOR WAVELENGTH REFERENCE MEASUREMENT IN WDM SYSTEMS

(75) Inventors: Hans-Ludwig Althaus, Lappersdorf (DE); Joachim Reill, Zeitlarn (DE); Karl-Heinz Schlereth, Burglengenfeld (DE)

(73) Assignee: Infineon Technologies AG, Munich (DE)

( * ) Notice: Subject to any disclaimer, the term of this patent is extended or adjusted under 35 U.S.C. 154(b) by 39 days.

(21) Appl. No.: 10/253,220

(22) Filed: Sep. 24, 2002

(65) Prior Publication Data

US 2003/0067658 A1 Apr. 10, 2003

Related U.S. Application Data

(63) Continuation of application No. PCT/DE01/01079, filed on Mar. 19, 2001.

(30) Foreign Application Priority Data

Mar. 24, 2000 (DE) .......................................... 100 14 644

(51) Int. Cl.⁷ .............................. G02B 6/36; G02B 6/34
(52) U.S. Cl. .............................. 385/92; 385/12; 385/37
(58) Field of Search ............................. 385/92, 12, 37; 351/416, 419

(56) References Cited

U.S. PATENT DOCUMENTS

| | | | |
|---|---|---|---|
| 4,767,171 A | 8/1988 | Keil et al. | |
| 4,955,086 A | 9/1990 | Kindt | |
| 5,875,273 A | 2/1999 | Mizrahi et al. | |
| 5,949,562 A | 9/1999 | Kubota et al. | |
| 6,052,179 A | * 4/2000 | Prohaska et al. | 356/73.1 |
| 2002/0076132 A1 | * 6/2002 | Peral et al. | 385/15 |
| 2002/0093657 A1 | * 7/2002 | Friberg et al. | 356/419 |
| 2003/0059150 A1 | * 3/2003 | Lyons | 385/12 |

FOREIGN PATENT DOCUMENTS

| | | |
|---|---|---|
| DE | 197 54 910 C2 | 7/1999 |
| EP | 0 715 429 A2 | 6/1996 |
| EP | 0 924 546 A1 | 6/1999 |

* cited by examiner

Primary Examiner—Hernang Sanghavi
(74) Attorney, Agent, or Firm—Laurence A. Greenberg; Werner H. Stemer; Ralph E. Locher

(57) ABSTRACT

An optical for wavelength reference measurement has in essence an optical conductor with integrated fiber Bragg grating that has a transmission maximum at a desired wavelength. Arranged downstream of the fiber Bragg grating is a photoreceiver receiving the measuring radiation beam passing through the fiber Bragg grating. If desired, it is possible to use a beam splitter to produce a reference radiation beam that is detected in a further photoreceiver.

9 Claims, 1 Drawing Sheet

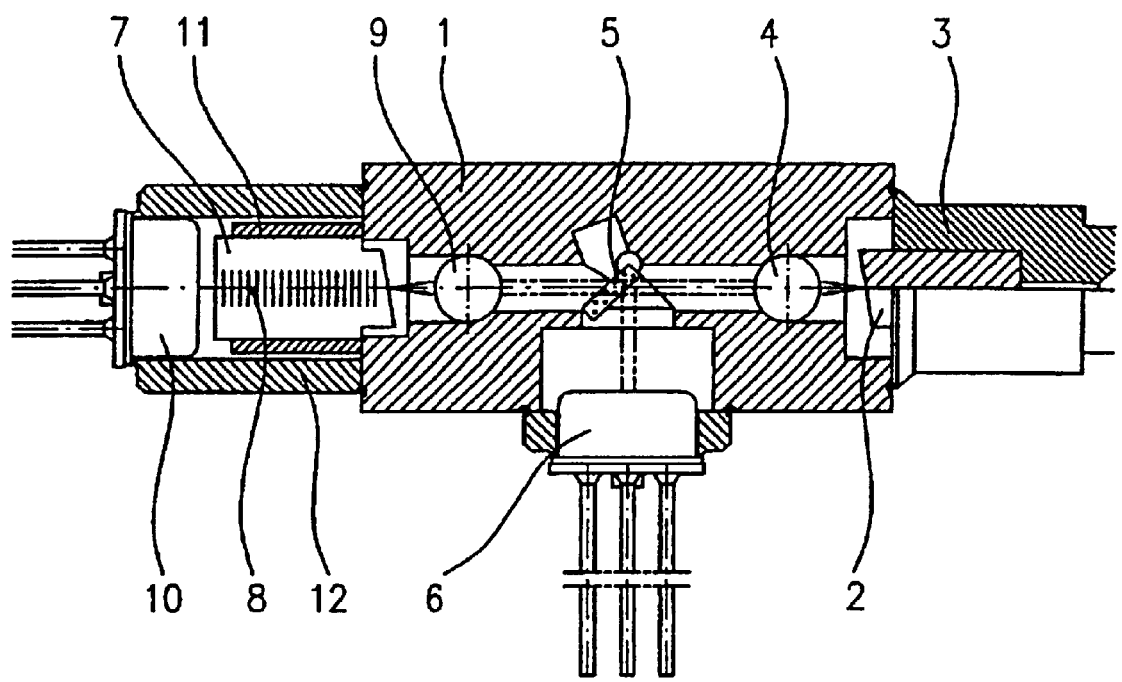

OPTICAL MODULE FOR WAVELENGTH REFERENCE MEASUREMENT IN WDM SYSTEMS

CROSS-REFERENCE TO RELATED APPLICATION:

This application is a continuation of copending International Application No. PCT/DE01/01079, filed Mar. 19, 2001, which designated the United States and which was not published in English.

BACKGROUND OF THE INVENTION

Field of the Invention

The invention relates to an optical module for wavelength reference measurement in optical fiber systems. More specifically, the invention relates in particular to optical multiplexer/demultiplexer systems or so-called WDM (wavelength division multiplex) systems, in which a plurality of different wavelengths are continuously being transmitted in both directions of an optical conductor cable. It is very important in such systems for the prescribed wavelengths to be exactly observed, in order to permit acceptable channel separation. In laser modules for WDM systems, it is therefore necessary to carry out wavelength reference measurement that is as exact as possible. For cooled WDM laser modules, the laser beam sources, that is to say semiconductor lasers, as a rule, must be measured and adjusted exactly to a wavelength of ±50 pm. This condition must be ensured over the entire temperature range and the lifetime of the laser module.

In the measuring devices previously used for wavelength reference measurement, use has been made of etalon filters or Fabry-Perot filters. These filters are constructed in such a way that two optical fibers are situated with their end faces opposite one another such that the end faces are parallel to one another and a Fabry-Perot resonator is thereby formed between the end faces. The wavelength-dependent transmission of such a Fabry-Perot resonator is described by the so-called Airy function that is substantially determined by the resonator length, the refractive index and the absorption coefficient of the material located between the resonator mirrors, and by the wavelength. These parameters can be set so as to produce relatively narrow band transmission bands that are relatively far apart from one another. European published patent application EP 0 715 429 A2 (see also U.S. Pat. No. 5,949,562) describes a WDM module in the case of which such fiber Fabry-Perot filters are used. The filters used therein can, moreover, be tuned by the piezoelectrically controlled displacement of one of the resonator end faces, and thus variation in the resonator length.

However, the Fabry-Perot filters described have the disadvantage that they exhibit a relatively strong functional dependence between the relative angular position of the resonator end faces and the incident radiation beam and the filter curve.

SUMMARY OF THE INVENTION

It is accordingly an object of the invention to provide an optical module for wavelength reference measurement in optical fiber systems which overcomes the above-mentioned disadvantages of the heretofore-known devices and methods of this general type and which makes lesser demands on mechanical stability by comparison with conventional measuring devices, without losing precision in the wavelength reference measurement in the process.

With the foregoing and other objects in view there is provided, in accordance with the invention, an optical module for wavelength reference measurement, comprising:
- a main module body formed with a light input opening for receiving a radiation beam, and an inner cavity for a first beam path and a second beam path of the radiation beam coupled in at the light input opening;
- a first photoreceiver disposed to receive the radiation beam in a first beam path and to generate a reference signal; and
- an optical conductor formed with an integrated fiber Bragg grating and a second photoreceiver disposed downstream of the optical conductor in a second beam path for producing a measuring signal, the integrated fiber Bragg grating having a transmission maximum at a desired wavelength.

In other words, the novel optical module for wavelength reference measurement, particularly in optical fiber systems, includes an optical conductor that is arranged in the beam path of a coupled-in radiation beam and has an integrated fiber Bragg grating that has a transmission maximum at a desired wavelength; and at least one photoreceiver, arranged downstream of the fiber Bragg grating, for receiving the radiation beam passing through the fiber Bragg grating.

Fiber Bragg gratings integrated in optical fibers are known per se in the prior art, However, in the case of the present invention a fiber Bragg grating is used for the first time as a wavelength-selective filter for wavelength reference measurement. A fiber Bragg grating that is inserted into a single mode fiber at a suitable length can be fixed the required filter characteristic permanently and reliably during production of the grating. The filter characteristic is thereby no longer a function of the construction of the overall module, and can thereby also be implemented in a correspondingly cost-effective fashion. Moreover, the respectively desired wavelength is only to be selected and fixed by the appropriate fiber Bragg grating. The mechanical tolerance problems occurring in the prior art because of the use of the Fabry-Perot filters can be circumvented with the aid of fiber Bragg gratings. In fiber Bragg gratings, the multilayer resonator is worked into the optical fiber, thus automatically excluding twisting of the fiber Bragg resonator relative to the beam direction. Wavelength reference measuring units constructed with the aid of fiber Bragg gratings therefore place less of a demand on the mechanical stability by comparison with conventional designs. This has a very positive effect on the materials used and the production outlay.

A preferred configuration of the module according to the invention includes
- a beam splitter, arranged in the beam path of the coupled-in optical radiation, for the purpose of producing two optical paths;
- a first optical path, at whose end a first photoreceiver is provided for the purpose of generating a reference signal;
- a second optical path, at whose end a second photoreceiver is provided for the purpose of generating a measuring signal, and in which the optical conductor with integrated fiber Bragg grating is arranged, and
- an electric detection circuit that is fed the output signals of the photoreceivers and which establishes by comparison of the output signals whether the coupled-in optical radiation is situated in the region of the desired wavelength.

In the case of this configuration of the module according to the invention, it is preferred that a positive lens, i.e., a collector lens, in particular a spherical lens, can be arranged in the second optical path between the beam splitter and the fiber Bragg grating in order to focus the parallel radiation beam into the fiber Bragg grating.

Available components can be implemented in a modified BIDI. module housing in a particularly efficient way for the purpose of constructing a module according to the invention. Such a module housing has a main body of the module, at one end of which the fiber connection opening is arranged, and at whose opposite end a first opening on the output side is arranged, and in a side wall a second opening on the output side is arranged. The fiber Bragg grating is integrated into the module in such a way in that the optical conductor with the integrated fiber Bragg grating is fastened in a first cylindrical sleeve that is fastened coaxially with the second optical path on the opening rim of the first opening, on the output side, in the module housing, and in that the second photoreceiver is fastened in the outer end of a second cylindrical sleeve that is fastened on the opening rim of the first opening on the output side in a fashion coaxial with the second optical path and enclosing the first cylindrical sleeve.

In addition, the module housing can be provided with an external temperature stabilization by means of a cooler or a heating element.

Other features which are considered as characteristic for the invention are set forth in the appended claims.

Although the invention is illustrated and described herein as embodied in a optical module for wavelength reference measurement in WDM systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE is a longitudinal section of a module according to the invention.

DESCRIPTION OF THE PREFERRED EMBODIMENTS

Referring now to the sole figure of the drawing in detail, there is shown a module according to the invention produced from a modified BIDI module housing. It has a main module body 1 that has openings on the light input and output sides, between which optical paths can be implemented. A fiber connection opening is located on the right-hand side of the figure. An optical fiber 2 can be coupled to the fiber connection opening. At its end on the module side, the optical fiber is located inside a fiber flange 3 that is connected to the main body 2 of the module by a circumferential laser weld on an end face of the main body 1 of the module.

The radiation beam emerging from the optical fiber 2 is rendered parallel by a first spherical lens 4. Subsequently, the parallelized radiation beam strikes a 3 dB beam splitter 5 that is held in the main body 1 of the module and at which it is split into two component beams of the same intensity. A first component beam—the reference radiation beam—is deflected by a right angle at the beam splitter 5 and subsequently strikes the receiving surface of a first photodiode 6. A second component beam—the measuring radiation beam—passes through the beam splitter 5.

The measuring radiation beam is subsequently fed to an optical conductor 7 with integrated fiber Bragg grating 8. The second radiation beam is thereby focused into the fiber Bragg grating 8 with the aid of a second spherical lens 9. After passing through the optical conductor 7 with the integrated fiber Bragg grating 8, the measuring radiation beam strikes the receiving surface of a second photodiode 10.

The fiber Bragg grating 8 is produced in a way known per se and has a wavelength-dependent transmission with a transmission maximum at a prescribed wavelength. The output signals of the two photodiodes 6 and 10 are fed to a suitable electric detection circuit that establishes by the comparison of the output signals whether the wavelength of the coupled-in optical radiation is at the transmission maximum of the fiber Bragg grating 8.

The optical conductor 7 is firstly inserted into a sleeve 11 in order to fasten it on the main body 1 of the module, and permanently connected to said sleeve 11. The latter is fastened with its end face on the opening rim of the first opening of the main body 1 of the module on the light output side in such a way that it is coaxial with the beam path of the measuring radiation beam, and the measuring radiation beam can be guided optimally in the optical conductor 7 and the fiber Bragg grating 8. The photodiode 10 is held in the outer end of a second sleeve 12, whose inside diameter is greater than the outside diameter of the first sleeve 11, and which is likewise connected at its opposite end face to the opening rim of the first opening of the main body 1 of the module on the light output side. This latter can be achieved, in turn, by laser welding, a circumferential weld being produced as a result.

At its end facing the main module body 1, the optical conductor 7 preferably has a projection with a beveled light input surface. This projection is inserted during the fastening into a recess of corresponding size in the first opening of the main body 1 of the module on the light output side.

The second opening of the main module body 1 on the light output side serves the purpose of holding and fastening the first photodiode 6, and is formed in a side wall of the main body 1 of the module. The second photodiode 6 is inserted in a way known per se into a short metallic sleeve that is fastened on the opening rim of the second opening on the light output side by welding, preferably in turn by a laser welding operation.

Another design of the module according to the invention is also possible, in which case the fiber Bragg grating 8 is integrated in a suitable PLC board.

It is also theoretically conceivable that only a single photodiode is used to detect the radiation beam passing through the fiber Bragg grating, and that the wavelength of the coupled-in optical radiation is controlled to the maximum of the output signal of the photodiode. It is possible in this case to dispense with the beam splitter, and the main body of the module can be more simply formed.

In addition, it is possible to provide temperature stabilization, for example by arranging a temperature sensor on the surface of the optical conductor 7 and placing on the module housing a cooling element such as a Peltier element, which ensures that a constant temperature is maintained. Alternatively, the temperature stabilization can also be circumvented by means of digital control in conjunction with a known filter curve.

We claim:

1. An optical module for wavelength reference measurement, comprising:

a main module body formed with a light input opening for receiving a radiation beam, and an inner cavity defining a first free beam path and a second free beam path for the radiation beam coupled in at said light input opening;

a first photoreceiver disposed to receive the radiation beam in said first free beam path and to generate a reference signal; and an optical conductor formed with an integrated fiber Bragg grating and a second photoreceiver disposed downstream of said optical conductor in said second free beam path for producing a measuring signal, said integrated fiber Bragg grating having a transmission maximum at a desired wavelength.

2. The optical module according to claim 1, wherein said main module body is couplable into an optical fiber system.

3. The optical module according to claim 1, wherein said main module body has two wall openings for respectively holding said first and second photoreceivers.

4. The optical module according to claim 1, which comprises beam splitter disposed in said cavity for producing said first and second free beam paths.

5. The optical module according to claim 4, wherein:

said beam splitter is formed to reflect a portion of the radiation beam in said first free beam path towards said first photoreceiver; and said beam splitter is formed to pass a portion of the radiation beam in said second free beam path towards said optical conductor formed with said integrated fiber Bragg grating, and through to said second photoreceiver disposed behind said second optical conductor.

6. The optical module according to claim 3, wherein said main module body has a first wall opening with an opening rim; a first cylindrical sleeve is fastened coaxially with an optical axis of th said second free beam path on said opening rim of said first wall opening of said main module body; said optical conductor with said integrated fiber Bragg grating is fastened in said first cylindrical sleeve; a second cylindrical sleeve is fastened on said opening rim of said first wall opening coaxially with the optical axis of said second free beam path and encloses said first cylindrical sleeve, said second cylindrical sleeve has an outer end and said second photoreceiver is fastened in said outer end.

7. The optical module according to claim 4, which comprises a positive lens disposed in said second free beam path between said beam splitter and said fiber Bragg grating for focusing a parallel radiation beam into said fiber Bragg grating.

8. The optical module according to claim 7, wherein said positive lens is a spherical lens.

9. The optical module according to claim 1, wherein said first and second free beam paths are first and second unguided beam paths.

* * * * *